Patented Mar. 30, 1943

2,315,232

UNITED STATES PATENT OFFICE 2,315,232

WATER-INSOLUBLE DISAZO DYES

Alfred Thurm, Dessau in Anhalt, and Hans Krzikalla and Alfred Kirsch, Ludwigshafen, Germany, assignor to General Aniline & Film Corporation, a corporation of Delaware No Drawing. Application March 25, 1937, Serial No. 133,006. In Germany March 31, 1936

8 Claims. (Cl. 260—178)

Our present invention relates to new valuable disazo dyes soluble in organic agents and corresponding to the general formula

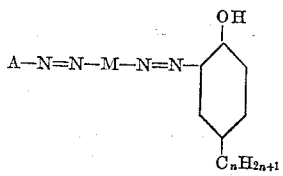

wherein A is a radicle of the benzene series including the para-alkylphenol appearing as end component in the formula given above, M is a radicle of the benzene and naphthalene series including those having more than one benzene nucleus and $n$ is a number greater than 2, these dyes containing neither groups which lend solubility nor nitro groups.

A further object of our invention is a process for manufacturing these dyes.

Dyes corresponding to the formula given above, are obtainable by diazotizing an aminoazo compound of the benzene or naphthalene series having neither a nitro group nor any group which imparts solubility in water, and coupling the diazo compound with a para-alkylphenol containing in the alkyl group at least three carbon atoms.

In a somewhat modified manner dyes of this kind are obtainable by tetrazotizing an aromatic diamine and coupling the tetrazo compound with the said para-alkylphenols. Suitable diamines are, for example, diaminodiphenyl, diaminodiphenylmethane, diaminotriphenylmethane, diaminodiphenylcyclohexane, diaminodiphenyl ether, diaminoazoxybenzene and substitution products of any of these.

As para-alkylphenols which are useful according to our invention, we enumerate, for instance, para-propyl-, para-butyl-, para-amyl-, para-hexyl-, para-heptyl-, and para-octyl-phenols. From the isomeric compounds of these groups we prefer those having a branched chain, such as para-sec. butylphenol, para-isoamylphenol or para-isohexylphenol. The para-alkylphenols used in the invention may be obtained by various processes, for example by alkali fusion of the corresponding para-alkylbenzene sulfonic acids or by condensation of phenols with alcohols or olefines in the presence of catalysts.

It is not necessary to perform a separation of the mixtures of isomeric compounds obtainable according to these processes, since dyes of outstandingly good solubility are obtained when using these mixtures as azo components.

The disazo dyes produced are suitable for coloring fats, oils, candles, lacquers, artificial masses and similar products. They may be used with advantage for the graphic arts, in particular for double tone printing. As compared with the known similar disazo dyes which contain phenol or cresol as coupling components they exhibit a high solubility in organic media and a freedom from odor and also possess a good to very good fastness to light.

The invention is illustrated by the following examples, the parts being by weight:

*Example 1.*—22.5 parts of 2-aminoazotoluene are diazotized in the usual manner by the addition of 60 parts of hydrochloric acid of 12° Bé. and 6.9 parts of sodium nitrite; the diazo solution is filtered and run at 0° C. into an aqueous solution of 17.8 parts of para-isohexylphenol and 10 parts of sodium hydroxide to which an emulsifying agent has preferably been added. When coupling is complete, the mixture is heated to about 60° C. and filtered at room temperature, the solid matter being then washed and dried. The dye dissolves in organic solvents to a brownish orange solution.

*Example 2.*—25.5 parts of the combination 3 - amino - 1 - methylbenzene→3 - amino - 4-methoxy-1-methylbenzene are diazotized in the usual manner by addition of 60 parts of hydrochloric acid of 12° Bé. and 6.9 parts of sodium nitrite; the diazo solution is filtered and at 0° C. is run into a solution of 17.8 parts of para-isohexylphenol in 250 parts of caustic soda lye containing 6 parts of sodium hydroxide and about 3 parts of an emulsifying agent. While the diazo solution is being run in there are gradually added 40 parts of a caustic soda solution of 10 per cent. strength. When the coupling is complete the procedure is similar to that described in Example 1. The dye dyes organic materials yellow brown fast to light.

*Example 3.*—26.9 parts of the dye xylidine→3-amino-4-methoxy-1-methylbenzene, obtainable by coupling the commercial mixture of xylidines with 3-amino-4-methoxy-1-methylbenzene in presence of sodium acetate are diazotized with 60 parts of hydrochloric acid of 12° Bé. and 6.9 parts of sodium nitrite; the diazo solution is filtered and coupled as described in Example 2 with 17.8 parts of para-isohexyl-phenol. The dye dissolves in organic solvents a brown similar to that of the dye of Example 2.

*Example 4.*—21.2 parts of 4.4′-diamino-3.3′-dimethyldiphenyl are tetrazotized by means of 100 parts of hydrochloric acid of 12° Bé. and 13.8 parts of sodium nitrite and this solution is run at 0° C. into a solution of 35.6 parts of para-isohexylphenol, 16 parts of sodium hydroxide and 6 parts of an emulsifying agent. The dye is worked up in the usual manner. It dyes orange tints.

*Example 5.*—29.4 parts of 1.1-(4′.4″-diamino-3′.3″-dimethyldiphenyl)-cyclohexane are tetrazotized by the addition of 100 parts of hydrochloric acid of 12° Bé. and 13.8 parts of sodium nitrite at 0° C.; the solution is filtered and coupled with an emulsion of 41.6 parts of α.α.γ.γ-tetramethylbutylphenol, 16 parts of sodium hydroxide, about 500 parts of water, 10 parts of an emulsifying agent being used. The dye colors organic solvents pure yellow.

The following table comprises a number of further dyes which can be made by the invention and the tints obtainable from them:

| Diazo-component | Coupling component | Color tint |
|---|---|---|
| Aminoazobenzene | Para-tert. butylphenol. | Orange. |
| Do | Para-isoamyl-phenol. | Brownish orange. |
| Aminoazotoluene | Para-tert. butylphenol. | Orange. |
| Meta-aminoazotoluene | Para-isohexyl-phenol. | Brownish orange somewhat redder. |
| Toluidine-azo-3-amino-4-methoxytoluene. | ___do___ | Yellowish brown. |
| Mixture of isomeric amino sec. butylbenzenes-azo-3-amino-4-methoxytoluene. | ___do___ | Do. |
| Aniline-azo-aminohydroquinone dimethyl ether. | ___do___ | Reddish brown. |
| Para-anisidine-azo-aminohydroquinone dimethyl ether. | Para-tert. butylphenol. | Brown red. |
| Aniline-azo-α-naphthylamine. | Para-isoamyl-phenol. | Brown. |
| Do | α.α.γ.γ.-tetramethylbutylphenol. | Do. |
| Benzidine | Para-isohexyl-phenol. | Reddish yellow. |
| 2.2′-dimethylbenzidine | ___do___ | Yellow. |
| 4.4′-diaminodiphenylmethane. | ___do___ | Greenish yellow. |
| 4.4′-diaminodiphenyldimethylmethane. | Para-tert.butylphenol. | Yellow. |
| 4.4′-diaminodixylylphenylmethane. | ___do___ | Do. |
| Do | Para-isohexyl-phenol. | Do. |
| 4.4′-diamino-triphenylmethane. | ___do___ | Greenish yellow. |
| 2.4′-diaminodiphenyl | ___do___ | Yellow. |
| 2.4′-diamino-3.3′-dimethyldiphenyl. | ___do___ | Orange. |
| 4.4′-diaminodiphenyl ether. | ___do___ | Greenish yellow. |
| 4.4′-diaminodiphenylamine. | ___do___ | Brown. |
| 3.3′-diaminoazoxybenzene | ___do___ | Yellow. |
| 1.1-(4′.4″-diaminodiphenyl)-cyclohexane. | α.α.γ.γ.-tetramethylbutylphenol. | Do. |
| 1.1-(4′.4″-diamino-3′.3″-dimethyldiphenyl)-cyclohexane. | Para-isohexyl-phenol. | Do. |
| Do | Para-butylphenol (from a commercial mixture of butylenes). | Do. |
| Do | Para-sec.-butylphenol. | Do. |

In the foregoing we have given a great number of examples showing how our invention may be carried out. However, the invention is not limited to these examples or to the specific details given therein and especially the alkyl phenols mentioned in the examples and in the table may be substituted by others having the general formula given above.

What we claim is:

1. The water-insoluble disazo dyes which correspond to the general formula

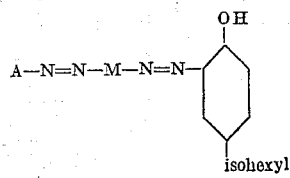

wherein A is a radicle of the benzene series, M is a radicle selected from the group consisting of radicals of the benzene, naphthalene, diphenyl, diphenylmethane, triphenylmethane, diphenylcyclohexane, diphenylether, and diphenylamine series, the dye molecule containing neither groups which lend solubility in water nor nitro groups, these dyes having a high solubility in organic media and a good to very good fastness to light.

2. The water-insoluble disazo dyes which correspond to the general formula

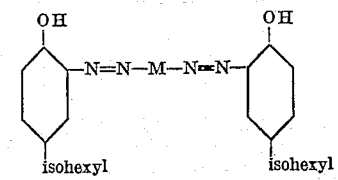

wherein M is a radicle containing at least two benzene nuclei, the dye molecule containing neither groups which lend solubility in water nor nitro groups, these dyes having a high solubility in organic media and a good to very good fastness to light.

3. The water-insoluble disazo dyes which correspond to the general formula

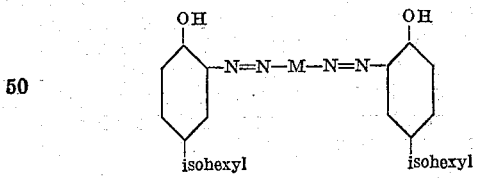

wherein M is a radicle containing two benzene nuclei, the dye molecule containing neither groups which lend solubility in water nor nitro groups, these dyes having a high solubility in organic media and a good to very good fastness to light.

4. The water-insoluble disazo dyes which correspond to the general formula

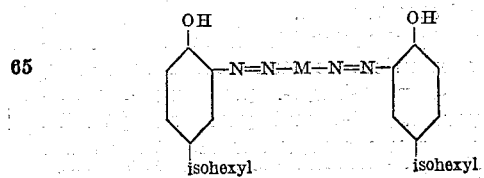

wherein M is a radicle of the benzidine series, the dye molecule containing neither groups which lend solubility in water nor nitro groups, these dyes having a high solubility in organic media and a good to very good fastness to light.

5. The dye which corresponds to the formula
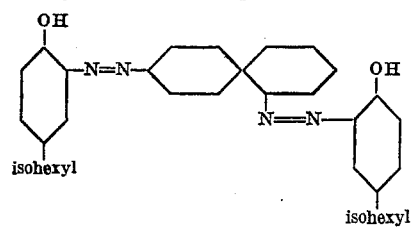
6. The dye which corresponds to the formula
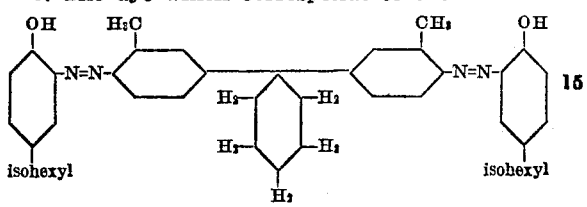
7. The dye which corresponds to the formula
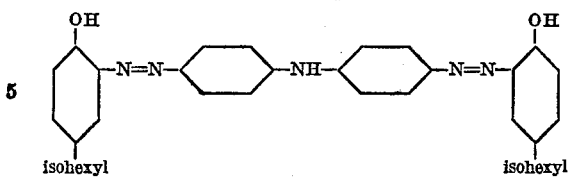
8. The process which comprises tetrazotizing a diamine containing at least 2 benzene nuclei, and coupling the tetrazo compound with para-isohexylphenol.
ALFRED THURM.
HANS KRZIKALLA.
ALFRED KIRSCH.